O. FRICKE.
AUTOMATIC FOG SAFETY SHIP'S GUIDE.
APPLICATION FILED DEC. 2, 1914.

1,225,796.

Patented May 15, 1917.
5 SHEETS—SHEET 1.

WITNESSES
A. Laksy.
K. Johnson.

INVENTOR
Otto Fricke.

O. FRICKE.
AUTOMATIC FOG SAFETY SHIP'S GUIDE.
APPLICATION FILED DEC. 2, 1914.

1,225,796.

Patented May 15, 1917.
5 SHEETS—SHEET 2.

WITNESSES
A. Laksy.
K. Johnson.

INVENTOR
Otto Fricke.

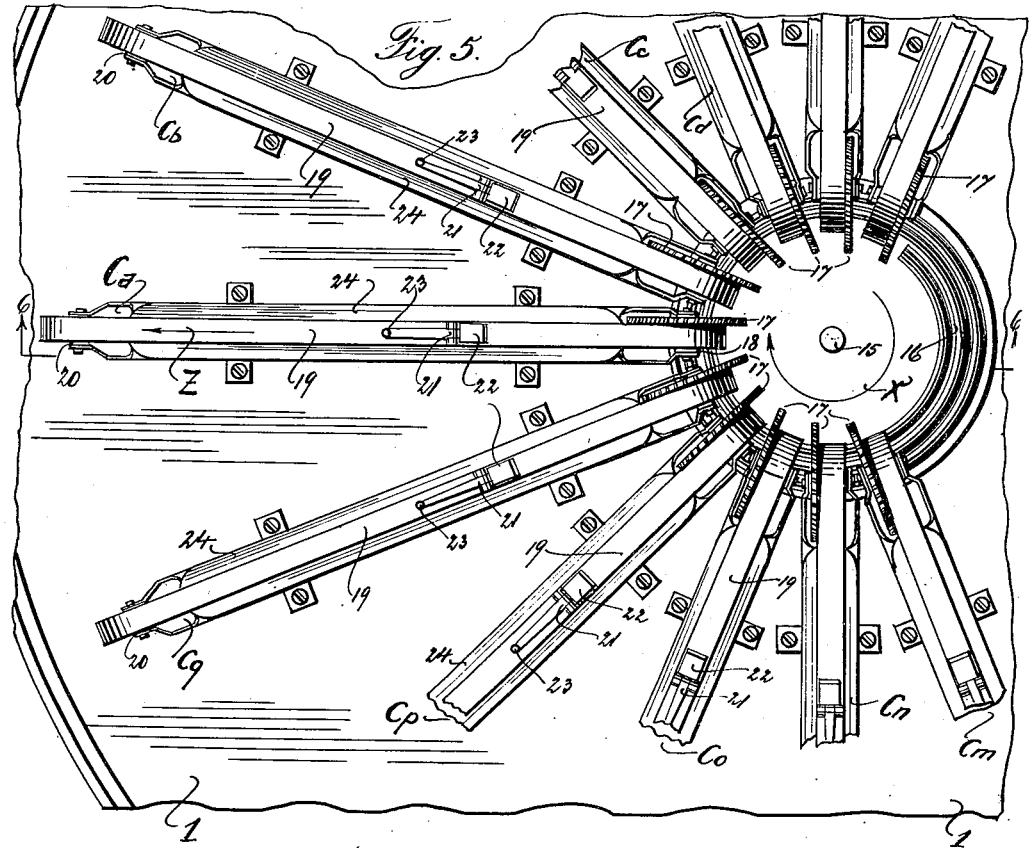
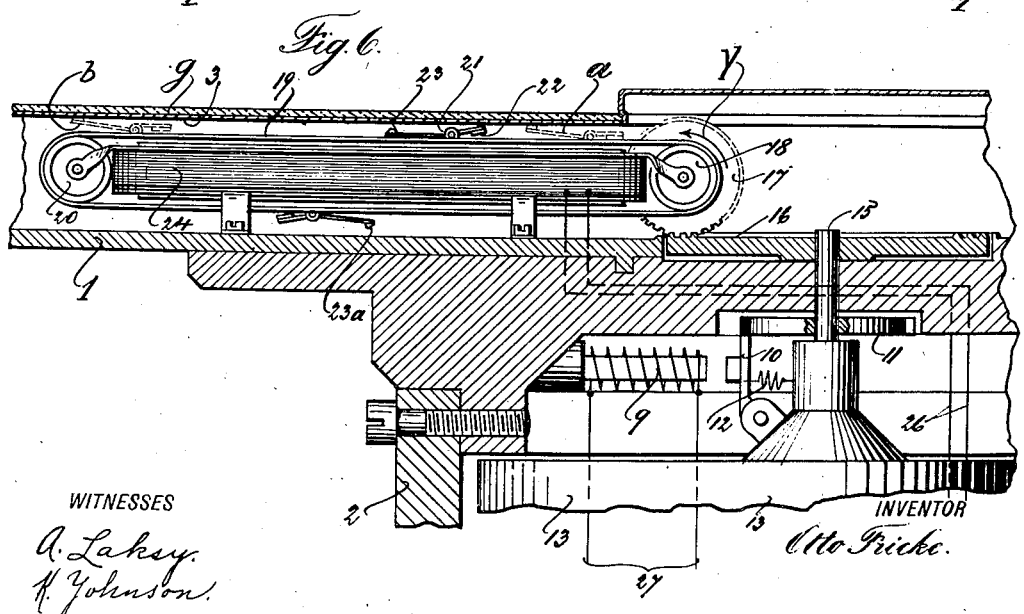

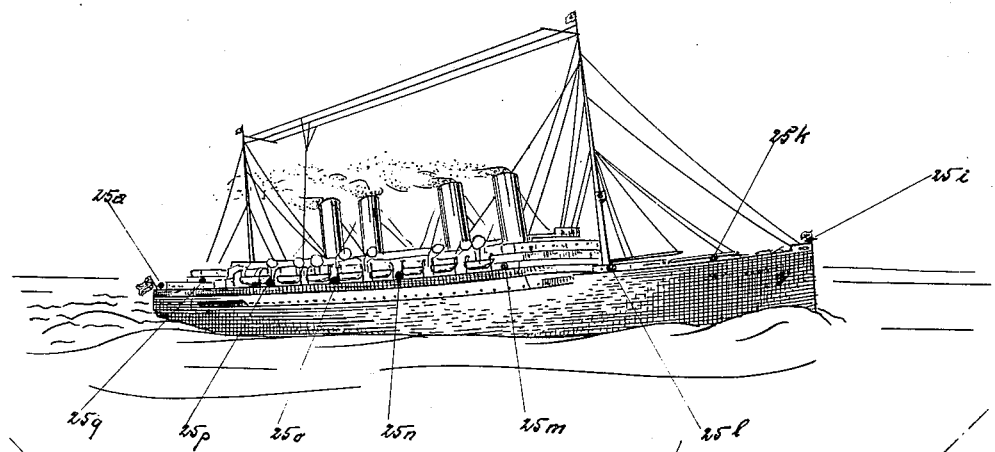
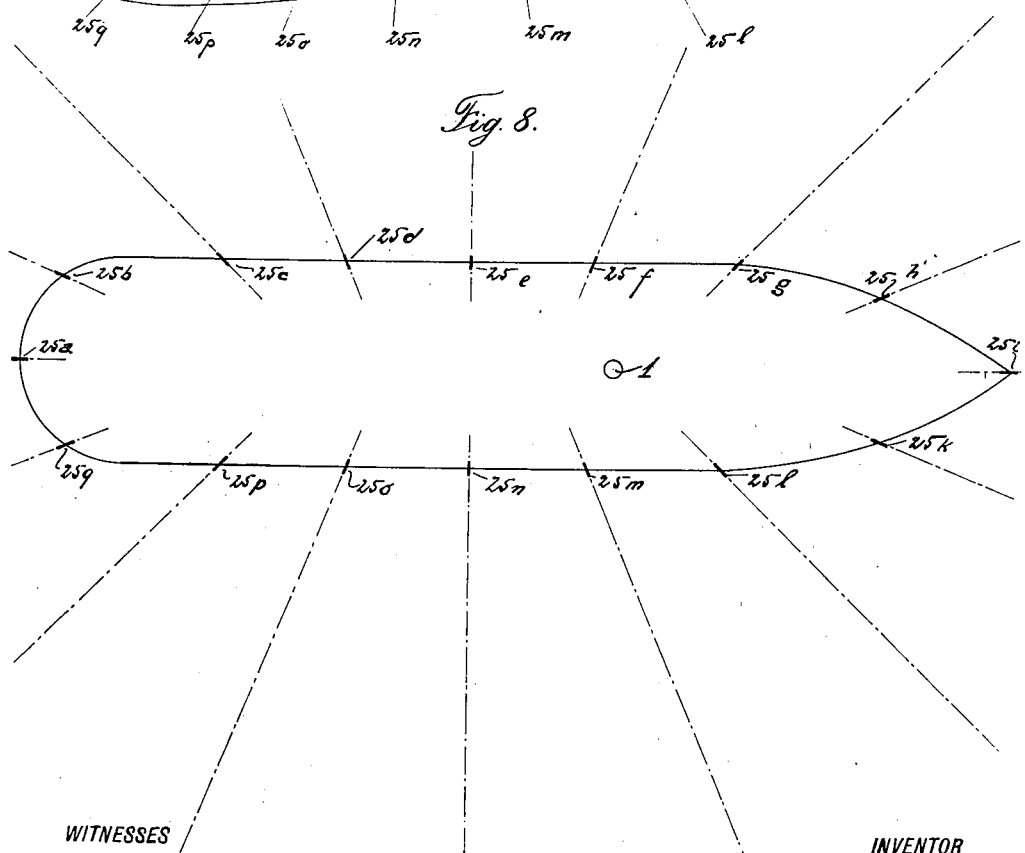

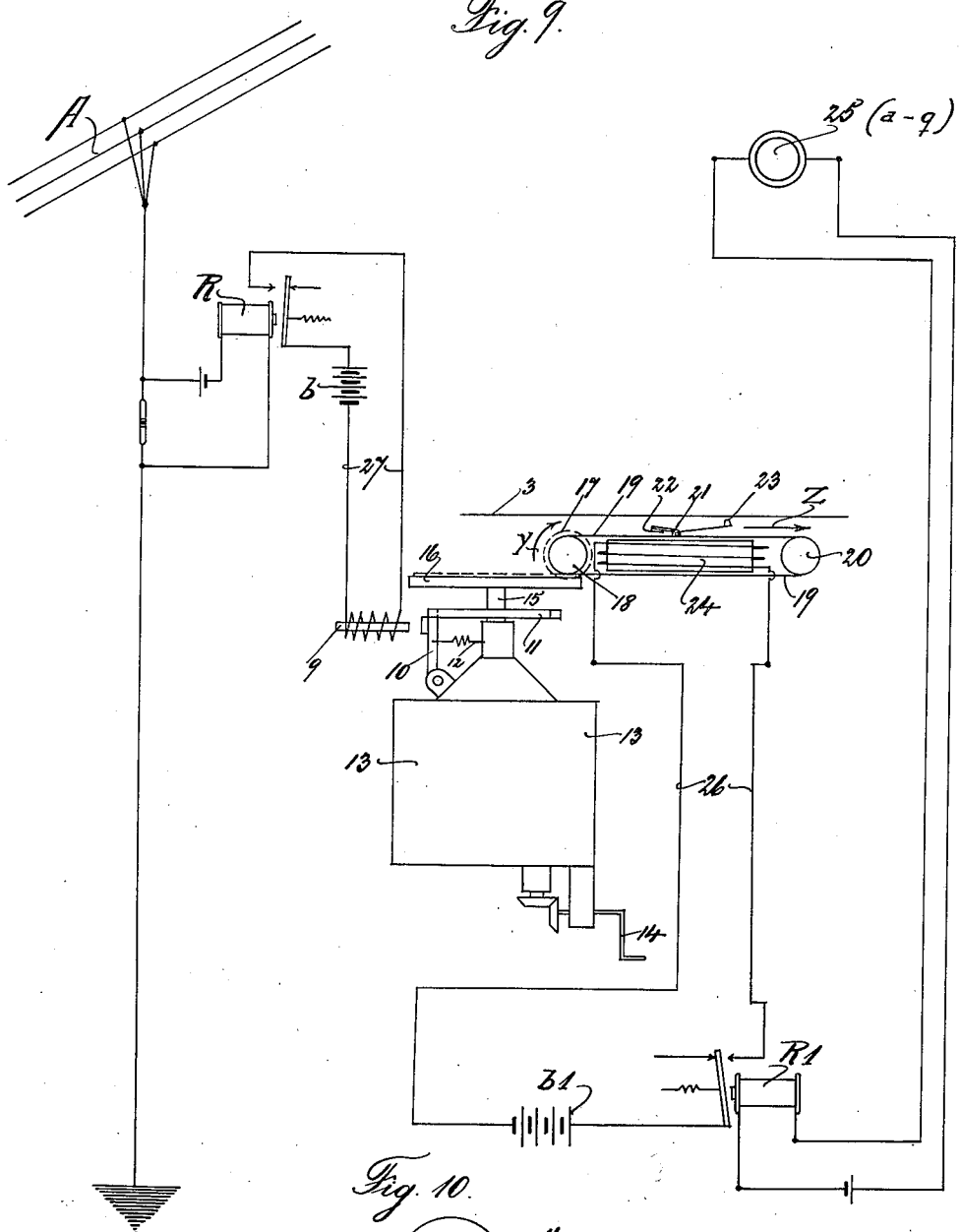

UNITED STATES PATENT OFFICE.

OTTO FRICKE, OF NEW YORK, N. Y.

AUTOMATIC FOG SAFETY SHIP'S GUIDE.

1,225,796.  Specification of Letters Patent.  Patented May 15, 1917.

Application filed December 2, 1914. Serial No. 875,166.

*To all whom it may concern:*

Be it known that I, OTTO FRICKE, a citizen of the town of Hamburg, Germany, and resident of New York, in the county and borough of Bronx and State of New York, have invented a certain new and useful Instrument—namely, an Automatic Fog Safety Ship's Guide, of which the following is a specification.

The invention is an instrument, which automatically indicates the bearing and the distance of ships in reference to the position of the vessel on board of which such an instrument has been installed.

The majority of accidents on sea are due to impenetrable atmosphere. The important objects of the invention are to render navigation under such circumstances safe, and to produce a permanent record for court inquiry of the ship's relative positions in case of accidents.

To accomplish the above objects, the invention consists in the novel construction, combination, arrangements of parts, and in the combined use of the difference in speed of electricity and sound.

The accompanying drawings form part of this specification. Similar characters of reference indicate corresponding parts in all the views.

Fig. 6, is a section taken at line 6—6 of Fig. 5 and shows also a modification of the cover "*g*,"

Fig. 7, is a perspective side view of a steamer, showing proposed location of receiving instruments on board of ship, Fig. 8, is a diagram of a boat's deck of a vessel, showing proposed location of instruments, Fig. 9, is a diagram illustrating the electric installations of the invention, Fig. 10, is a plan view of the locking disk 11.

Figure 1:
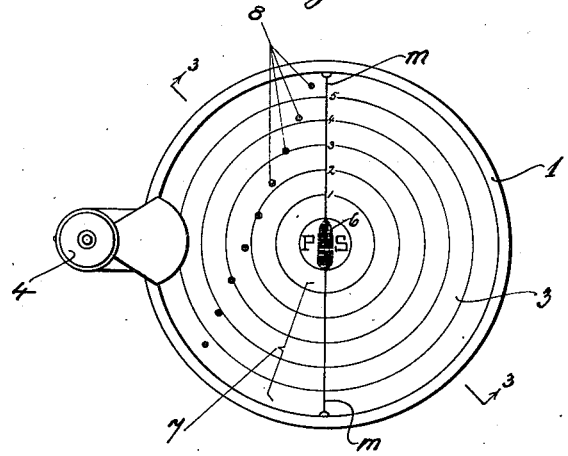
Figure 1, is a plan view of the instrument.
Figure 2:
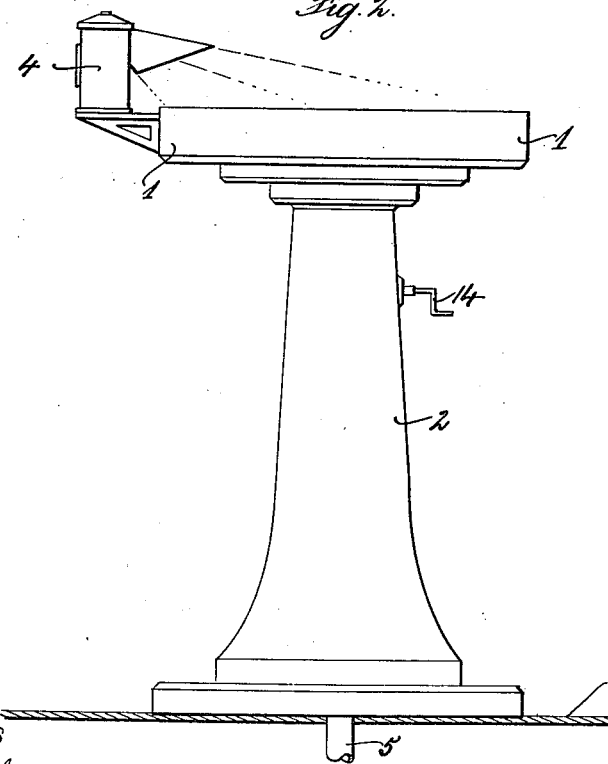
Fig. 2, is a side elevation of the same.
Figure 3:
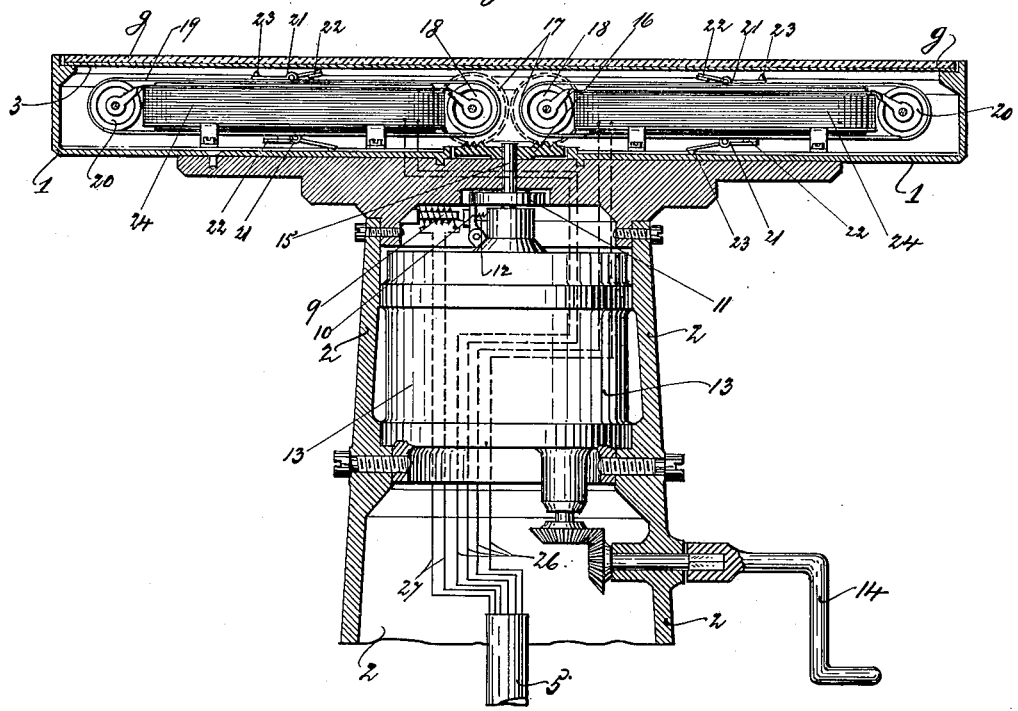
Fig. 3, is a partial section taken at line 3—3 in Fig. 1, showing a general arrangement of parts.
Figure 4:
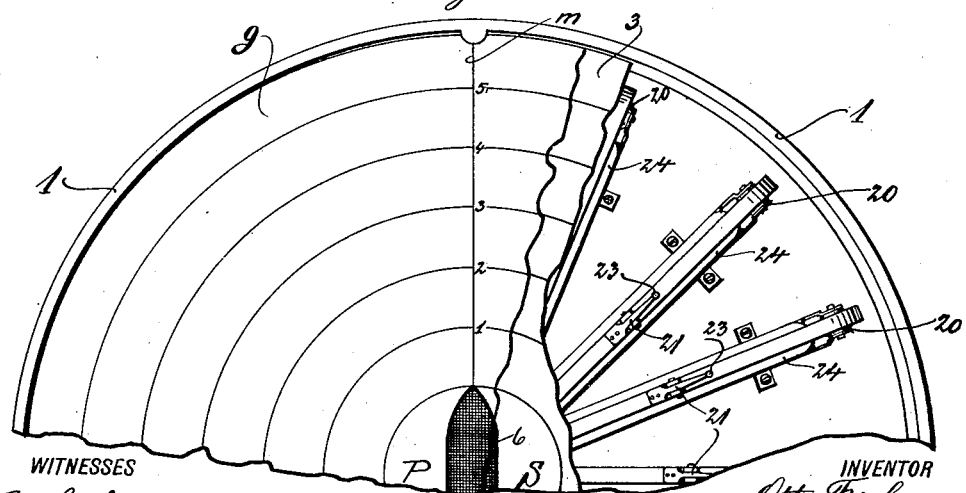
Fig. 4, is a partial plan view of Fig. 3, Fig. 5, is a detailed plan view showing inner parts.

It is deemed practical to design the instrument as shown in Figs. 1 and 2. The instrument having a table like top 1, the casing, and a hollow footing 2. The latter is connected in suitable manner to the deck or floor *d* of the ship's pilot house. Part 1 carries a dial 3, Figs. 1, 3, 4 and 6, which is covered by a glass plate *g*, which can be formed as shown in Figs. 3 and 4 or 6. In Fig. 6 the center part of the glass plate *g* is removable, in order to make the interior parts of the instrument readily accessible. The mark 6 (Fig. 1) may be indicated upon this center part.

The dial 3 may if necessary be illuminated by a lamp 4, Figs. 1 and 2. The pipe 5, Figs. 2 and 3, leads the necessary wiring through the footing 2 into the instrument. The upper part of the hollow footing 2 contains a clock work 13, Figs. 3 and 6, which is wound up by handle 14, Figs. 2 and 3.

As shown in Fig. 1, the dial 3 has at its center a permanent mark 6. This mark 6 indicates the position of the ship, on which this instrument has been installed. Hereafter it will be called "our ship." Around this mark 6 numbered circles 7 are arranged. These numbered circles represent distances within radius of our ship. Thus every point indicated on circle 4, Figs. 1 and 4, for instance, represents a point four nautical miles away from our ship. The graduation of dial 3 may be differently arranged and adapted to any other unit of length and it may also be graduated in degrees around the center, thus making it simpler for the navigator to read off and determine the bearing of another ship or object relatively to his. The median line *m* of dial 3, Figs. 1 and 4, represents the course of our ship, and is so arranged that the line *m* is parallel with the axis of our ship. The left side of the median line *m* represents the port side of our ship, and is therefore designated by P, and the starboard side is therefore designated by S, or the circles of dial 3, may also be colored with their respective colors red and green. The dial 3, which is preferably made of transparent paper, is removable and can be kept on file, and if necessary presented to the court in case of investigation. The marks 8 on dial 3 are indicated positions of another ship coming within the zone of the instrument on our ship. From these marks 8 it can be seen, that when the ship first came within the zone of the instrument, she was five and a half, in this case miles, ahead of our ship (Fig. 1). By following the marks 8 (Fig. 1) which the other ship automatically indicates by her own signals, her course can be traced in respect to ours. It can also be seen that the other ship passed ours on the port side with a nearest distance of two miles. These marks 8 result from the combined action of electric wireless and audible signals. It is, however, necessary that the wireless and audible signals of the other ship be sent at the same instance. This is done by an electric key of known type, which causes the steam whistle of the vessel to blow, and at the same moment to send a wireless signal "a dash." The wireless "dash" is instantly received by the instrument on our ship through the wireless apparatus of the usual type. The instrument being connected by a switch, during impenetrable atmosphere, to the wireless apparatus of our ship, in such a way, that the electromagnet 9, Figs. 3, 6 and 9, is operated by the other ship's wireless "dash." The electromagnet when under the influence of electric current, pulls the link 10, Figs. 3, 6 and 9, toward itself and thus unlocks the disk 11, Figs. 3, 6, 9 and 10, which is then free to rotate until it is locked again by the link 10 under the action of the spring 12. The disk 11 is driven by clock work 13, Figs. 3, 6 and 9, which is wound up with handle 14, Figs. 2, 3 and 9, by the navigator when necessary. While the disk 11, and thus also the axis 15, Figs. 3, 5, 6 and 9, is rotated by the clock work 13 in the direction of the arrow X shown in Fig. 5, a rotation is also imparted to the gears 17, Figs. 3, 5, 6 and 9, in the direction of the arrow Y, Figs. 6 and 9. Gear 16 is a spiral gear (Figs. 3 and 6). Gears 17 are connected to pulleys 18, Figs. 3, 5 and 6. These pulleys 18 drive belts 19 in the direction of the arrow Z, Figs. 5 and 9. These belts 19 bear light levers 21, which are preferably made of aluminum and carry a soft iron part or armature 22. At the opposite end of the levers tinting points 23, Figs. 3, 4, 5, 6 and 9 are arranged. The space between the runs of the belts 19 is occupied by electromagnets 24, Figs. 3, 4, 5, 6 and 9. These magnets 24 are operated by the receiving apparatus 25 ($a-q$) of the audible signals Figs. 7, 8 and 9. The wiring 27, for releasing the clock work 13, is indicated at Figs. 3, 6 and 9. As shown in Figs. 4 and 5 the movement of the clock work 13, and the transmission of the motion to belts 19, and thus the motion of the tinting points 23, is so arranged, that the tinting points or printing points 23 move radially away from the center in proportional speed to the speed at which the sound travels. The distance traversed by the printing points 23, in respect to the graduation of dial 3, is proportional to the distance traversed by the sound, which operates the points 23. The motion of the tinting points 23 is so arranged, that when it has reached its end position the opposite tinting point 23$^a$ (Fig. 6) is in starting position "$a$" (Fig. 6), until the disk 11 is unlocked again.

Now, then, assuming that on the other ship the fog whistle and the wireless "dash" are given at the same moment, referring to Fig. 9, the electric waves sent wireless are received by the antenna A, Fig. 9 and operate the relay R instantly, thus closing the circuit of battery $b$, whose current through wiring 27 acts on magnet 9. The consequences are that magnet 9 unlocks by the link 10 the disk 11, which on account of the clock work 13 then rotates together with the spiral gear 16, thus imparting radial outward motion to the belt 19 through gear 17 and pulley 18. As the sound travels slower than electricity, the sound of the other steamer's whistle is received later. The instant the transmitter 25 ($a-q$) Fig. 9, receives said sound, it operates the relay R$^1$ and thus closes instantly the circuit of battery $b^1$, whose current acts upon the electromagnet 24, and thus pulls down the iron part or armature 22 of the lever 21, whereby the tinting point 23 is caused to leave a mark upon the back side of the paper dial 3. As the motion of 23 started at the instant the other ship gave its signal by wireless and fog whistle, and as the tinting point 23 moves proportional to the speed of the sound and plotting a mark when its transmitter receives audible signal, the distance between the starting position "$a$", Fig. 6, of 23 and the position at which the tinting point 23 plots its mark "$b$", Fig. 6, corresponds to the distance traversed by the sound coming from its source. Thus by means of the graduation of dial 3, the distance of the source of the sound can be read off directly, as the dial 3 is transparent and the marks 8 (Fig. 1) show through it from the underside of said dial.

In order to indicate and record the direction from which the audible signal is received, it is proposed to arrange a plurality of sound recorders around a center as shown partly in Fig. 5. Each sound recorder is connected to a corresponding sound transmitter, which is preferably installed on the boat deck of the vessel. The planned location of the sound transmitters 25 is shown in Fig. 7 and in Fig. 8. In Fig. 8 the center lines of the transmitters are indicated, and from these it can be seen, that each transmitter takes care of a certain direction around the ship. Any audible signal taken up by these transmitters is instantly recorded by the corresponding recorder in the instrument on the dial 3.

The transmitter 25$^a$, Fig. 8, for instance operates recorder C^a, Fig. 5; 25^b, Fig. 8, operates the recorder C^b, Fig. 5; 25^c, Fig. 8, operates the recorder C^c, Fig. 5; 25^n, Fig. 8, operates the recorder C^n, partially shown in Fig. 5; and 25^q, Fig. 8, operates the recorder C^q, Fig. 5, and so on. As will be seen from the Figs. 7 and 8, the ship can receive wireless and audible signals from all directions, and by the foregoing the combined action of wireless and audible signals will record on the instrument the distance and the direction or bearing of the object from which those signals have been given.

As it sometimes occurs, especially in crowded waters near important ports, several steamers might signal at the same time during impenetrable atmosphere. The instrument can record any number of distances and courses. It is but advisable to observe the present understanding between seamen, not to signal all at the same time, the same rule being observed by wireless operators.

From the practical standpoint, navigation is rendered safe during impenetrable atmosphere by the use of this instrument on every vessel. Each steamer has by means of said instrument a visible and permanent indication of the other ship's distance and course.

A great benefit upon humanity and a great blessing to mankind will be realized by this safety device.

From the foregoing description taken in connection with the accompanying drawings, the advantage of the construction, operation and the accomplished object of the instrument will be readily understood by those skilled in the art to which the invention pertains, and of which I have described the principle of operation together with the device, which I now consider to be the best embodiment thereof.

I desire to have it understood that the device shown is merely illustrative and that such changes may be made when desired as are within the scope of the appended claims.

I claim:

1. The combination of a sending station, a receiving station, at least one of said stations being in motion, a record receiving member located at the receiving station and means coöperating with said record receiving member, and arranged to be actuated by signals sent coincidentally from the sending station and having different speeds of travel whereby a record visibly indicating the movements of the moving station is produced upon said record receiving member.

2. The combination of a sending station, a receiving station, at least one of said stations being in motion, a record receiving member located at the receiving station and means coöperating with said record receiving member and arranged to be actuated by an electric impulse and the sound waves of an audible signal sent coincidentally with said electric impulse from said sending station whereby a record visibly indicating the movements of the moving station is produced upon said record receiving member.

3. An instrument of the kind described comprising means for receiving an electric impulse, a driving mechanism controlled by said means and adapted to be set in motion as said electric impulse is received, a marking device caused to travel in an inoperative position by said driving mechanism, a chart located in proximity to the path of said marking device and means actuated by sound waves produced by an audible signal sent coincidentally with said electric impulse whereby said marking device is moved from an operative to an inoperative position to produce a mark upon said chart.

4. An instrument of the kind described comprising means for receiving an electric impulse signal, a driving mechanism controlled by said means and adapted to be set in motion as said electric impulse is received, a plurality of endless belts extending radially from a given point and adapted to be actuated by said driving mechanism, marking devices carried by said belts and movable therewith in inoperative positions, a chart located in proximity to the paths of said marking devices and a plurality of means each controlling one of said marking devices and each adapted to be actuated by sound waves produced by an audible signal sent coincidentally with the electric impulse whereby said marking devices are operated to produce marks upon said chart.

5. The combination of a sending station and a receiving station, at least one of which is traveling, a record receiving member located at the receiving station and provided with indications designating distances, and means coöperating with said record receiving member and arranged to indicate the direction of location of one station relatively to the other, said means being operated by signals sent coincidentally from the sending station and having different speeds of travel whereby a record visibly indicating the path of the movable station, its distance from and its direction of location from the other station is produced upon said record receiving member.

6. The combination of a wireless telegraph, a driving mechanism, means operatively connected with said wireless telegraph and adapted to be actuated by electric impulse received thereby whereby said driving mechanism is controlled, a series of endless belts extending in radial directions from a given point and arranged to be actuated by said driving mechanism, pivoted members carried by said belts and movable therewith in inoperative positions, marking devices carried by said members at one end, armatures carried by said members at their opposite ends, a chart located in proximity to the paths of said marking devices, electrically actuated mechanisms coöperating with each armature to individually control said marking devices and a plurality of devices each controlling an individual electric mechanism and adapted to be actuated by sound waves produced by audible signals sent coincidentally with said electric impulses whereby each coöperating electric mechanism is operated to actuate the coöperating member and marking device to produce a mark upon said chart.

7. The combination of a wireless telegraph, a driving mechanism, means operatively connected with said wireless apparatus and adapted to be actuated by electric impulses received thereby whereby said driving mechanism is controlled, a support for said driving mechanism, a casing carried by said support, a driven member within said case and operatively connected with said driving mechanism, a plurality of endless belts within said casing and extending in radial directions therein, pulleys journaled in said casing for supporting said belts, an operative connection from one pulley of each belt to said driven members whereby said belts are caused to travel lengthwise by said driving mechanism, a graduated transparent dial located above and in close proximity to said belts, a transparent face plate carried by said casing above said belts, marking devices carried by said belts in inoperative positions, armatures carried by said marking devices, electromagnets located between the runs of said belts, and devices at a distance from said belts and extending in the same general direction adapted to be actuated by sound waves produced by signals sent coincidentally with the electric impulses and controlling the operation of said electromagnets and armatures whereby said marking devices are actuated to produce marks upon the said transparent dial from below.

8. The combination of a sending station, a receiving station, at least one of said stations being in motion, and an apparatus located at the receiving station and including a record receiving member and record producing means coöperating therewith, said apparatus being arranged to be actuated by signals sent coincidentally from the sending station and having different speeds of travel whereby a record visibly indicating the movements of a moving station is produced upon said record receiving member.

9. The combination of a sending station, a receiving station, at least one of said stations being in motion, a record receiving member located at said receiving station, and a plurality of movable marking devices coöperating with said record receiving member and adapted to be set in motion by electric impulses sent from said sending stations and subsequently actuated by the sound waves of audible signals sent coincidentally with said electric impulses from said sending stations whereby a record visibly indicating the relative positions of the sending and receiving stations is produced upon said record receiving member.

10. The combination of a sending station, a receiving station, at least one of said stations being in motion, a record receiving member located at said receiving station, a plurality of movable marking devices controlled by signals sent coincidentally from the sending station and coöperating with said record receiving member to produce a record visibly indicating the relative positions of the sending and receiving stations upon said record receiving member and mechanism controlled by said signals sent from the sending station and arranged to move said marking devices in directions opposite to the directions traveled by the signals from said sending stations.

11. An instrument of the kind described comprising a record-receiving member having a point indicating a receiving station thereon, and means coöperating with said record receiving member and arranged to be operated by signals sent coincidentally from a given point and having different speeds of travel whereby a record is produced upon said record receiving member in correlation to said point thereon visibly indicating the relative positions of the sending and receiving points.

12. An instrument of the kind described comprising a record receiving member provided with indications designating distances, and means coöperating with said record receiving member and arranged to be operated by signals sent coincidentally from a given point and having different speeds of travel, said means being arranged to indicate the direction of location of the sending point whereby a record visibly indicating the direction of location of the sending point relatively to the receiving point and the distance separating said points is produced upon said record receiving means.

13. An instrument of the kind described comprising a record receiving member provided with indications designating distances, a traveling marking device coöperating with said record receiving member and arranged to be operated by signals sent coincidentally from a given point and mechanism for moving said marking device at a speed in predetermined ratio to the speed of the slowest traveling signal whereby a record visibly indicating the relative positions of the sending and receiving points and the distance traversed by the signal is produced on the record receiving member.

14. An instrument of the kind described comprising a record receiving member, a plurality of movable marking devices controlled by signals sent coincidentally from a given point and having different speeds of travel, said signals coöperating with said record receiving member to produce a record visibly indicating the relative positions of the sending and receiving points upon said record receiving member and mechanism for moving said marking devices in directions opposite to the directions traveled by said signals from said given point.

15. An instrument of the kind described comprising a record receiving member having a point indicating a receiving station thereon, a marking device coöperating with said record receiving member, driving mechanism arranged to actuate one of said elements relatively to the other, and means controlling said mehcanism, said means and said marking device being arranged for actuation by signals sent coincidentally from a sending station and having different speeds of travel whereby said driving mechanism is released and said marking device is operated to produce a visible record upon said record receiving device in correlation to the point thereon whereby the relative positions of the sending and receiving stations are visibly indicated.

Signed at New York in the county and borough of Bronx and State of New York this twenty first day of July, A. D. 1914.

OTTO FRICKE.

Witnesses:
 LAWRENCE JOFFE,
 A. LAKSY.

---

Correction in Letters Patent No. 1,225,796.

It is hereby certified that in Letters Patent No. 1,225,796, granted May 15, 1917, upon the application of Otto Fricke, of New York, N. Y., for an improvement in "Automatic Fog Safety Ships' Guides," an error appears in the printed specification requiring correction as follows: Page 1, lines 2–3, for the words "a citizen of the town of Hamburg, Germany" read *a citizen of the United States;* and that the said Letters Patent should be read with this correction therein that the same may conform to the record of the case in the Patent Office.

Signed and sealed this 29th day of January, A. D., 1918.

[SEAL.]

R. F. WHITEHEAD,

*Acting Commissioner of Patents.*

Cl. 181—5.